E. G. MATTHEWS. 3 Sheets—Sheet 1.
Combined Cultivator and Seed-Drill.
No. 199,081. Patented Jan. 8, 1878.
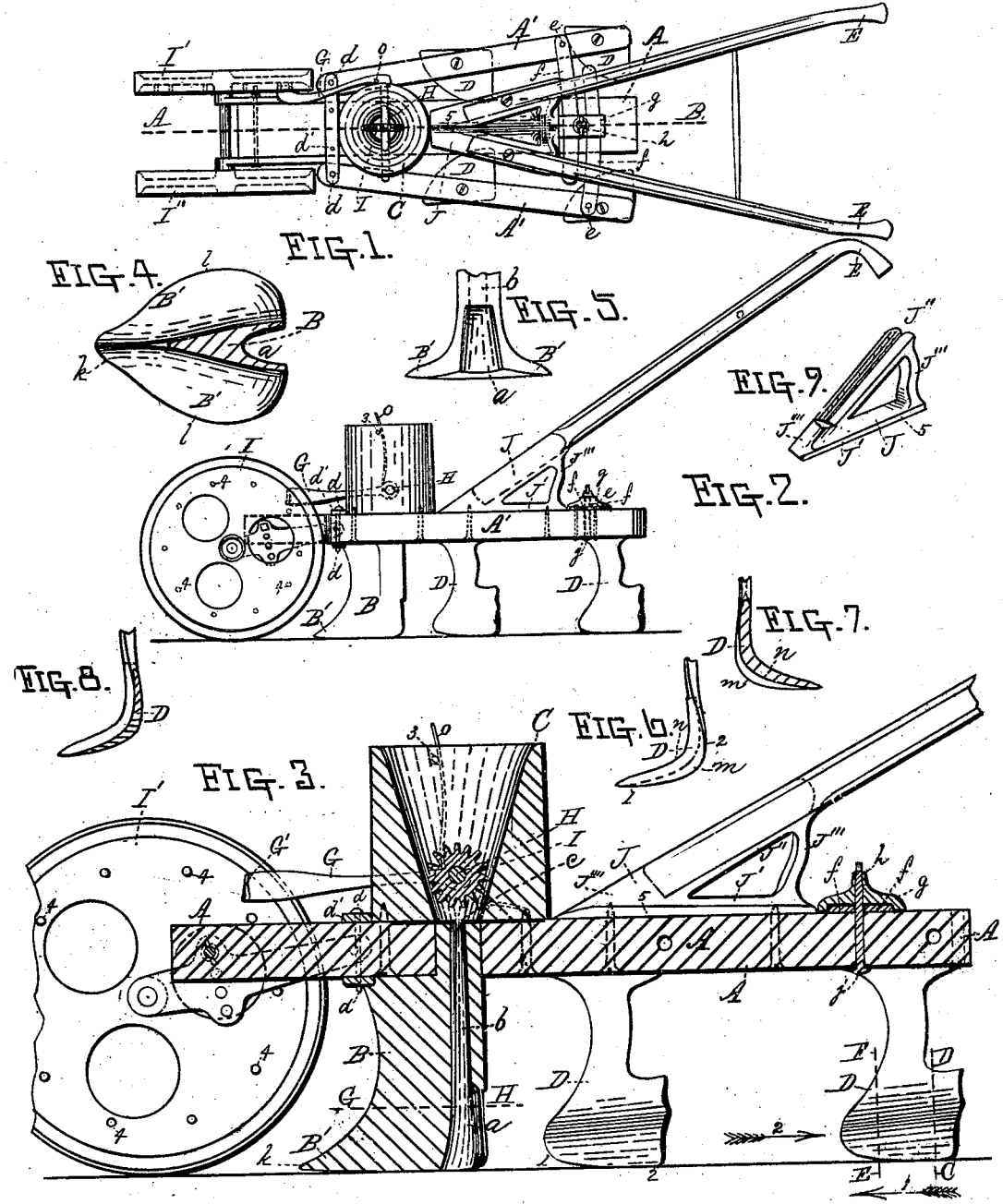

E. G. MATTHEWS.  
Combined Cultivator and Seed-Drill.  
No. 199,081. Patented Jan. 8, 1878.
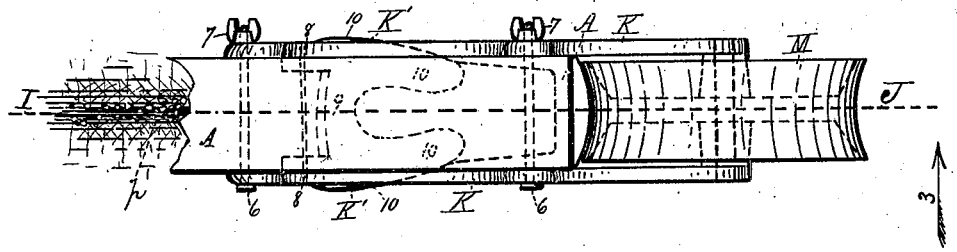
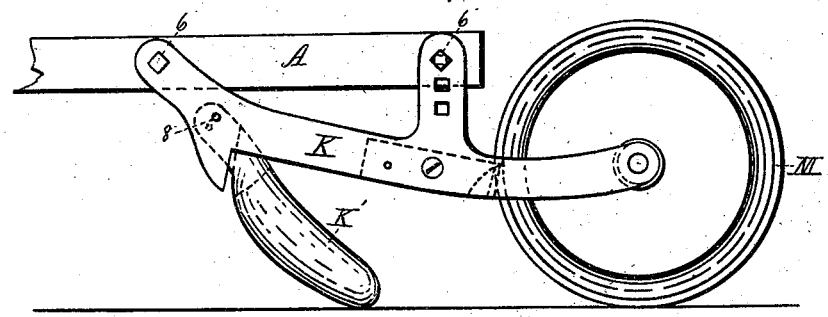
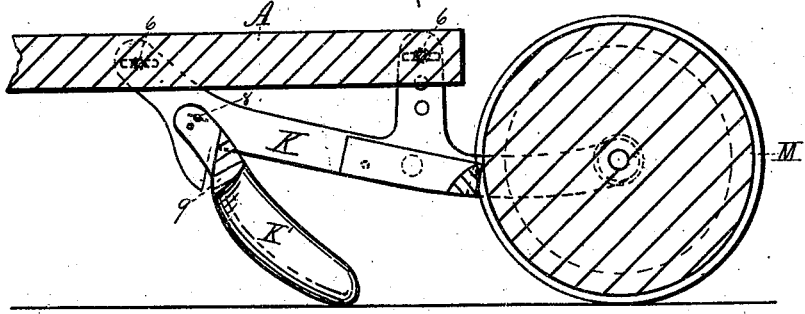
Witnesses:
Inventor:

E. G. MATTHEWS.
Combined Cultivator and Seed-Drill.
No. 199,081. Patented Jan. 8, 1878.
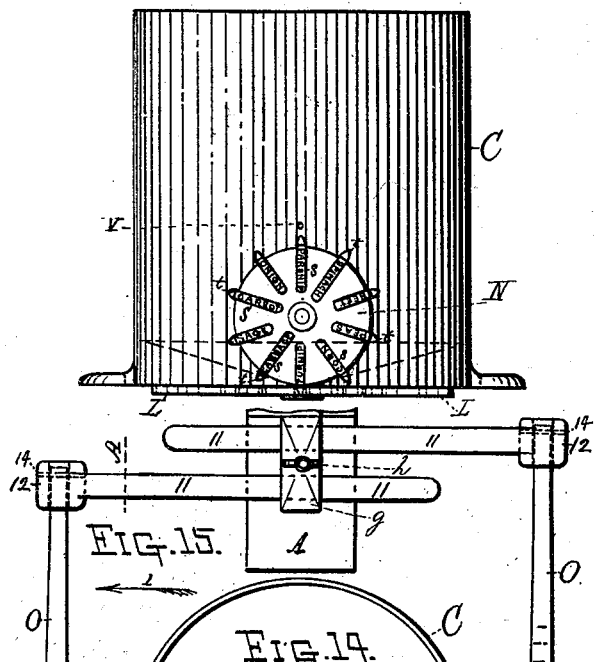
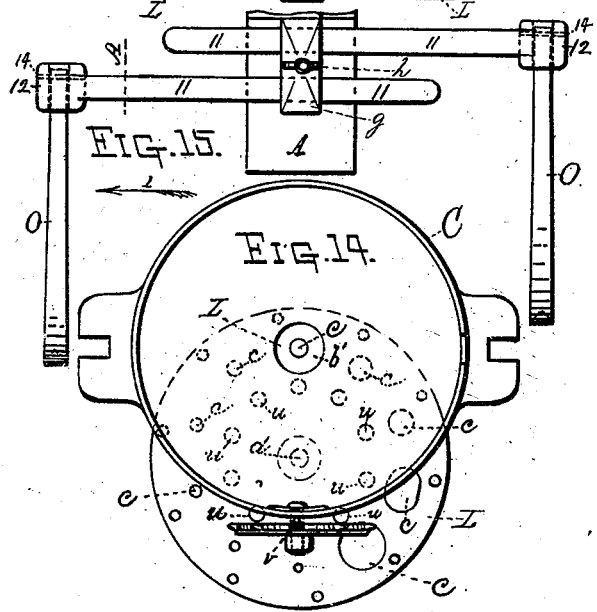
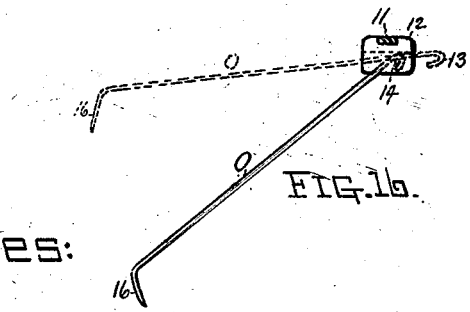
Witnesses:
Inventor:
Elbridge G. Matthews

UNITED STATES PATENT OFFICE.

ELBRIDGE G. MATTHEWS, OF OAKHAM, MASSACHUSETTS.

IMPROVEMENT IN COMBINED CULTIVATOR AND SEED-DRILL.

Specification forming part of Letters Patent No. 199,081, dated January 8, 1878; application filed April 13, 1877.

*To all whom it may concern:*

Be it known that I, ELBRIDGE G. MAT-THEWS, of Oakham, in the county of Worcester and Commonwealth of Massachusetts, have invented certain new and useful Improvements in Combined Cultivator and Seed-Drill; and I do hereby declare that the following is a full, clear, and exact description of the same, reference being had to the accompanying drawings, forming a part of this specification, and in which—

Figure 1 represents a top or plan view of the machine as arranged to be used as a cultivator. Fig. 2 represents a side view of the parts shown in Fig. 1. Fig. 3 represents, upon an enlarged scale, a section on line A B, Fig. 1, the front part of the forward wheel being shown broken away. Figs. 4, 5, 6, 7, 8, and 9 represent views of portions of the machine when arranged for use as a cultivator, as will be hereinafter more fully described; and Figs. 10, 11, 12, 13, 14, 15, and 16 represent views of parts of the machine when arranged for use as a seed-drill, as will be hereinafter more fully described. The figures from 3 to 16, inclusive, are represented upon an enlarged scale for the purpose of illustrating the invention or improvements more clearly.

To enable those skilled in the art to which my invention belongs to make and use the same, I will proceed to describe it more in detail.

In the drawings, the part marked A represents the main central framing of the machine, to the under side of which, near its front end, is secured the peculiarly-constructed combined seed-drill and cultivator-tooth B. This tooth is provided with a flaring or web-shaped foot, B', the rear part of which is recessed or cut out, as shown at $a$, while a tubular opening extends up through the shank of the tooth to the opening $c$ in the bottom of the seed-hopper C. To each side of the main framing A is hinged an auxiliary framing, A'. The front ends of the auxiliary framings A' are hinged to pivots $d$ in a cross-piece, $d'$, fastened to the top of framing A in front of the hopper C. To the rear upper edges of the auxiliary framings A' are hinged, at $e$, steadying and adjusting arms $f$, the inner ends of which slip or pass under a fastening-button, $g$, which is held in place upon the top of framing A by a thumb-nut, $h$, upon the upper end of a bolt, $j$, which passes up through the rear end of framing A. One of the arms $f$ passes in rear of bolt $j$, and the other in front of it, as fully indicated in Figs. 1 and 3 of the drawings.

By this arrangement the rear ends of auxiliary frames A' can be adjusted so as to stand at a greater or less angle with the main framing A, for the purpose of adjusting the cultivator-teeth D so as to stir and cultivate the ground close up to the stalks or bodies of the young plants.

The lower ends or feet of the cultivator-teeth B and D are made in a peculiar manner. The foot B' is made flat, with a sharp point, $k$, and flat side projections $l$, thus enabling the said central cultivator-tooth B, as it is drawn along between the rows of plants, to enter and run in the ground a short distance below the surface, thereby slicing, so to speak, the surface of the earth between the rows of plants, and that, too, without injury to the roots of the young plants.

The cultivator-teeth D are made so that when in use the front sharp edges $m$ will stand out farther than the rear parts $n$. They are also so made that they cut in inclined positions—that is to say, the parts $m$ of the teeth which approach nearest to the young plants rise up gradually as they extend from the point 1 to the point 2.

This construction and arrangement of the cultivator-teeth D, in a practical point of view, produces important results, since the attendant, while following the cultivator, with his hands on the handles E, can tell at a glance whether the cultivator-teeth are running too close to the plants or not, the cutting-points $m$ of the teeth always standing and running outside of the auxiliary framings A', as indicated in Fig. 1 of the drawings.

Then again, the inclined position of the teeth from the point 1 to the point 2 enables the attendant to run the teeth close up to the stems or stalks of the young plants for the purpose of stirring the earth and cutting up the weeds without danger or liability of disturbing or injuring the roots of the young plants; and this is particularly true in cultivating plants growing in hills slightly raised above the general surface of the ground between the rows of the young plants.

When the machine is used for cultivating the soil, arm $o$, which projects up from the hinged arm G, connected to the shaft H of the seed-agitator wheel I, is drawn back and sprung behind pin 3 in the side of the hopper or seed-box C, thereby retaining the point G' of agitator-arm G always above and out of reach of the pins 4 in the side of wheel I', as indicated in Figs. 2 and 3 of the drawings.

The lower front ends of the handles E are secured in peculiarly-constructed handle-brackets J. These brackets are made with a base, J', to rest upon the top of the framing A; a socket-piece, J'', upwardly, backwardly, and outwardly inclined; an inclined brace-piece, J''', connecting the outer ends of base-piece J' and socket-piece J''; and a solid point, J'''', for connecting the front ends of the base J' and the socket-piece J''. By this mode of construction the inner edges 5 of handle-brackets J, when placed in position upon frame A, as shown in Fig. 1, abut or rest against each other, thereby bracing each other, while at the same holding the handles in a secure and firm position upon the central frame A.

In the drawings, Fig. 4 represents a top or plan view of the lower part of the tooth B, being a section of said tooth on line G H, Fig. 3. Fig. 5 represents a rear view of the same parts. Fig. 6 represents a front view of the rear tooth D, looking in the direction of arrow 2, Fig. 3; and Figs. 7 and 8 represent sections of said teeth on lines C D and E F, Fig. 3, respectively, looking in the direction of arrows 1 and 2.

To arrange the machine for a seed-drill, the auxiliary frames A', with their guide-arms $f$ $f$ and cultivator-teeth D, are removed, and the detachable frame K is secured to the rear of frame-piece A by means of the bolts 6 and nuts 7.

Frame K supports a covering device, K', which is hinged to said frame at the points 8 8. The covering device is made with a top part or roof, 9, and with two covering-wings, 10 10, which gather the earth toward the center of the opening made by the foot part B' of the tooth B, the object being to properly cover the seed $p$ after it has been dropped from the seed-box C through one of the holes $c$ in the gage-plate L, which forms the bottom of the seed-box C. Frame K also supports the concave earth-pressing wheel M. The object of this wheel is to press down the earth after it has been drawn toward the center and over the seed $p$ by means of the seed-covering device K'. (Shown in full and dotted lines, Figs. 10, 11, and 12.)

The seed-box C is provided on one side with an indicating-wheel, N, having raised portions $s$, upon which the names of the different kinds of seeds to be planted are cast, stamped, or otherwise attached, as indicated in Fig. 13, and from the end of each name projects a point, $t$, which enters a corresponding hole, $u$, in the gage-plate L, which forms the bottom of the seed-box C.

The gage-plate L is provided with a series of holes, $c$, varying in size, and as said gage-plate is fitted to turn on a center, $a'$, holes $c$ will be brought in succession as the plate is turned under the opening $b'$ in the bottom of the seed-box C, a side view of said seed-box being shown in Fig. 13, and a top or plan view shown in Fig. 14, without a cover or top.

Marking-arms O are secured to supporting-arms 11, attached to the rear of frame-piece A, by means of piece $g$ and nut $h$, (same as arms $f f$ are attached in Fig. 1,) and these marking-arms are provided with hooked ends, so that they can be easily attached or detached from the heads 12 of supporting-arms 11.

When the machine is to be drawn over the ground from field to field, the hooked ends 13 of the marking-arms O are slipped back from their pivots 14, as indicated in dotted lines, Fig. 16, in which positions they will be sustained in an elevated position above the ground until drawn forward by the attendant, as indicated in full lines in the same figure.

It will be observed that the marking-arms O, when elevated and run forward, as before described, are prevented from dropping down to the ground again by their forward ends coming in contact with the recessed under sides of the heads 12, as indicated in dotted lines, Figs. 15 and 16, of the drawings, while their pivots 14 support them upon their under sides.

The marking-arms O can be easily detached by simply raising the rear end of the machine and swinging the arms forward and up into horizontal positions, when they can be run back so as to detach their hooked ends from the pivots 14, and by reversing the operation they can be as readily attached again.

Arms O, when their bent ends 16 rest on the ground, serve not only as markers to guide the attendant in putting in the seed, but also as lateral supports to keep the machine somewhat braced against undue lateral motion when in operation.

It will be understood that after the seed has been deposited in the seed-box, spring-rod $o$ is removed from pin 3, thus leaving arms G free to fall down, to be acted upon by the pins 4 as wheels I' I'' are rolled along upon the ground, thereby giving to the seed-agitating wheel I a rocking or partially-rotating motion sufficiently often to keep the seed from clogging up the hole in the gage-plate through which the seed passes to the ground.

As one or more of the points $t$ are always in mesh with the holes $u$ in plate L, there is no chance for any mistake when the machine is once properly adjusted or set for any particular kind of seed. The holes $c$ in plate L are made of varying sizes to properly pass the various kinds of seed.

If parsnip-seed is to be deposited, then the hole for parsnip-seed will be under the hole in the seed-box C when wheel N is in the position shown in Fig. 13, and by turning wheel N plate L can be moved to bring any other seed-hole, *u*, into position to pass seed. The attendant, therefore, has only to bring the point *t* of the projection *s*, having the name of the desired seed upon it, into a vertical position under the index-pin *v*, when the plate L can be secured in place by a hook or pin until another change of seed is desired, the whole operation being very simple and convenient.

Having described my improvements in combined cultivator and seed-drill, what I claim therein as new and of my invention, and desire to secure by Letters Patent, is—

1. The handle-bracket composed of two parts, arranged in juxtaposition, each part consisting of a brace, a base, an exterior flange, and a solid end, the last three elements being combined to converge to a common point, substantially as shown and set forth.

2. The combination, with the seed-box C and gage-plate L, of the operating and indicating seed-wheel N, substantially as and for the purposes set forth.

3. The combination, with the arms 11, provided with recessed or slotted heads 12, of adjustable marking and steadying arms O, substantially as described.

ELBRIDGE G. MATTHEWS.

Witnesses:
 THOS. H. DODGE,
 EDWIN E. MOORE.